(12) United States Patent
Fujishima et al.

(10) Patent No.: US 11,789,444 B2
(45) Date of Patent: Oct. 17, 2023

(54) MOVING CONTROL METHOD, MOVING CONTROL DEVICE, MOVING CONTROL SYSTEM, PROGRAM, AND STORAGE MEDIUM FOR MULTI-VEHICLE

(71) Applicants: MITSUBISHI HEAVY INDUSTRIES, LTD., Tokyo (JP); National University Corporation Tokai National Higher Education and Research System, Aichi (JP)

(72) Inventors: Yasuo Fujishima, Tokyo (JP); Kazushige Takaki, Tokyo (JP); Shunichi Azuma, Aichi (JP)

(73) Assignees: MITSUBISHI HEAVY INDUSTRIES, LTD., Tokyo (JP); NATIONAL UNIVERSITY CORPORATION TOKAI NATIONAL HIGHER EDUCATION AND RESEARCH SYSTEM, Aichi (JP)

( * ) Notice: Subject to any disclaimer, the term of this patent is extended or adjusted under 35 U.S.C. 154(b) by 346 days.

(21) Appl. No.: 17/270,308

(22) PCT Filed: Oct. 3, 2019

(86) PCT No.: PCT/JP2019/039060
§ 371 (c)(1),
(2) Date: Feb. 22, 2021

(87) PCT Pub. No.: WO2020/075614
PCT Pub. Date: Apr. 16, 2020

(65) Prior Publication Data
US 2021/0200205 A1    Jul. 1, 2021

(30) Foreign Application Priority Data

Oct. 9, 2018   (JP) ................................. 2018-191310

(51) Int. Cl.
*G05D 1/00* (2006.01)
*B60W 30/18* (2012.01)

(52) U.S. Cl.
CPC ...... *G05D 1/0027* (2013.01); *B60W 30/18009* (2013.01); *G05D 1/0022* (2013.01); *G05D 2201/0213* (2013.01)

(58) Field of Classification Search
CPC .......... B60W 30/18009; G05D 1/0027; G05D 2201/0213
See application file for complete search history.

(56) References Cited

U.S. PATENT DOCUMENTS

| | | | |
|---|---|---|---|
| 10,134,006 B2* | 11/2018 | Pandya | ............. G05B 19/41895 |
| 2009/0062974 A1* | 3/2009 | Tamamoto | ........... G05D 1/0295 |
| | | | 701/25 |
| 2018/0158016 A1 | 6/2018 | Pandya et al. | |

FOREIGN PATENT DOCUMENTS

| | | |
|---|---|---|
| JP | 63-242807 | 10/1988 |
| JP | 4-208400 | 7/1992 |

(Continued)

OTHER PUBLICATIONS

Machine Translation of Hiroyuki's reference (JPH-11276618-A) (Year: 1999).*

(Continued)

*Primary Examiner* — Tarek Elarabi
(74) *Attorney, Agent, or Firm* — Wenderoth, Lind & Ponack, L.L.P.

(57) ABSTRACT

A movement control method for a multi-vehicle system for moving multiple vehicles to target positions individually set for the vehicles includes: acquiring first positions of the vehicles; determining control input for moving the vehicles from the first positions to second positions away from the target positions by a first distance or more while the vehicles satisfy a predetermined condition; and updating the first (Continued)

distance to be a shorter distance when a distance between the second position and the target position of each of the vehicles becomes equal to or more than the first distance and within an updating distance.

15 Claims, 12 Drawing Sheets

(56) References Cited

FOREIGN PATENT DOCUMENTS

| JP | 6-259131 | 9/1994 |
| JP | 11-276618 | 10/1999 |
| JP | 2009-80804 | 4/2009 |
| JP | 2009-113660 | 5/2009 |

OTHER PUBLICATIONS

International Search Report dated Dec. 17, 2019 in International (PCT) Application No. PCT/JP2019/039060.
English translation of Written Opinion of the International Searching Authority dated Dec. 17, 2019 in International (PCT) Application No. PCT/JP2019/039060
Notice of Reasons for Refusal dated Mar. 22, 2023 in Japanese Patent Application No. 2018-191310, with English translation.
Notice of Reasons for Refusal dated Aug. 29, 2023 in Japanese Patent Application No. 2018-191310, with English translation.

\* cited by examiner

MOVING CONTROL METHOD, MOVING CONTROL DEVICE, MOVING CONTROL SYSTEM, PROGRAM, AND STORAGE MEDIUM FOR MULTI-VEHICLE

FIELD

The present invention relates to a movement control method, a movement control device, a movement control system, a program, and a storage medium for multi-vehicle.

BACKGROUND

As one of the technologies for moving a multi-vehicle system (Swarm technologies), a course control method for a plurality of ships is known (for example, Japanese Patent Application No. 2009-113660).

SUMMARY

Technical Problem

In the conventional technology, courses of a plurality of ships are merely determined. Thus, some ships may arrive at target positions earlier than other ships. In other words, it is difficult to coordinate timings at which a plurality of ships arrive at target positions.

In Swarm technologies for moving multi-vehicle that move in the sky, on the ground, in water or on water without being limited to ships on water as in the conventional technology, it is difficult to coordinate the timings of arrival at target positions.

The present invention has been made in view of the above-mentioned circumstances, and it is an object thereof to provide a movement control method, a movement control device, a movement control system, a program, and a storage medium for multi-vehicle with which timings of arrival at target positions can be further coordinated.

Solution to Problem

In order to solve the above-described problems and achieve the object, a movement control method for multi-vehicle according to the present invention is for moving multiple vehicles to target positions individually set for the vehicles, and includes the steps of: acquiring positions of the vehicles; determining control input for moving the vehicles from the acquired positions to positions away from the target positions by a first distance or more while the vehicles satisfy a predetermined condition; and updating the first distance to a shorter distance when a distance between the position and the target position of each of the vehicles becomes equal to or more than the first distance and within an updating distance.

With this configuration, after the vehicles move to positions away from the target positions by the first distance or more, the first distance is updated to a shorter distance. Consequently, the degrees of proximity of the vehicles with respect to the target positions can be coordinated. Thus, timings of arrival at the target positions can be further coordinated.

In this configuration, the step of transmitting the control input to each of the vehicles may be included.

In this configuration, processing for updating the first distance to a shorter distance may be repeatedly performed such that the vehicles are made closer to the respective target positions in a coordinated way.

In this configuration, the predetermined condition may include a condition that the vehicle is controlled to be away from another vehicle by a second distance or more.

In this configuration, the predetermined condition may include a condition that the vehicle is controlled to be away from a past movement route for another vehicle by a third distance or more.

In this configuration, the predetermined condition may include a condition that the vehicle is controlled to be away from the target position of another vehicle by a fourth distance or more.

In this configuration, the predetermined condition may include a condition that moving speed of the vehicle is within a range of a lower limit velocity to an upper limit velocity.

In this configuration, the predetermined condition may include a condition that the vehicle moves outside an entry prohibited region.

In this configuration, the step of updating the entry prohibited region to a narrower region when the position of each of the vehicles is within a fifth distance from the entry prohibited region may be included.

In this configuration, the narrower region may be a region within the entry prohibited region before the updating.

In this configuration, the entry prohibited region may include one or more of the target positions of the vehicles.

In this configuration, the step of controlling a relative positional relation of the vehicles to correspond to a relative positional relation of the target positions individually set for the vehicles may be included, and the step of controlling may be performed before the step of determining.

In this configuration, the predetermined condition may include a condition that a distance between a straight line passing through the position of the vehicle and the target position of the vehicle and the target position of another vehicle is a sixth distance or more.

In this configuration, the step of determining may include dividing a time that is assumed to elapse from the acquisition of the position of the vehicle until reflection of the control input to movement of the vehicle into a plurality of timings, and calculating a position of the vehicle predicted based on the control input calculated in past for each timing to calculate the control input to be newly provided.

A movement control device according to the present invention is for moving at least one of multiple vehicles to target positions individually set for the vehicles, and includes an acquisition unit configured to acquire a position of each of the vehicles; and a control unit configured to determine control input for moving the vehicles from the acquired positions to positions away from the target positions by a first distance or more while the vehicles satisfy a predetermined condition, and update the first distance to a shorter distance when a distance between the position and the target position of each of the vehicles becomes equal to or more than the first distance and within an updating distance.

In this configuration, the control unit may transmit the control input to each of the vehicles.

A movement control system according to the present invention includes multiple vehicles; and a movement control device that moves the vehicles to target positions individually set for the vehicles. The movement control device includes an acquisition unit configured to acquire positions of the vehicles; and a control unit configured to transmit, to each of the vehicles, control input for moving the vehicles from the acquired positions to positions away from the target positions by a first distance or more while the vehicles satisfy a predetermined condition, and update the first distance to a shorter distance when a distance between the position and the target position of each of the vehicles becomes equal to or more than the first distance and within an updating distance.

A movement control system according to the present invention includes multiple vehicles; and a movement control device provided to each of the vehicles. The movement control device includes an acquisition unit configured to acquire positions of the vehicles; and a control unit configured to determine control input for moving the vehicles from the acquired positions to positions away from target positions thereof by a first distance or more while the vehicles satisfy a predetermined condition, apply control input for a vehicle provided with the movement control device to the vehicle provided with the movement control device, and update the first distance to a shorter distance when a distance between the position of each of the vehicles and the target position becomes equal to or more than the first distance and within an updating distance.

A program according to the present invention is for moving at least one of multiple vehicles to target positions individually set for the vehicles. The program causes a computer to execute the steps of: acquiring positions of the vehicles; determining control input for moving the vehicles from the acquired positions to positions away from the target positions by a first distance or more while the vehicles satisfy a predetermined condition; and updating the first distance to a shorter distance when a distance between the position and the target position of each of the vehicles becomes equal to or more than the first distance and within an updating distance.

A computer-readable storage medium according to the present invention has stored thereon a program for moving at least one of multiple vehicles to target positions individually set for the vehicles. The program causes a computer to execute the steps of: acquiring positions of the vehicles; determining control input for moving the vehicles from the acquired positions to positions away from the target positions by a first distance or more while the vehicles satisfy a predetermined condition; and updating the first distance to a shorter distance when a distance between the position and the target position of each of the vehicles becomes equal to or more than the first distance and within an updating distance.

Advantageous Effects of Invention

According to the present invention, timings of arrival at target positions can be further coordinated.

DESCRIPTION OF EMBODIMENTS

Figure 1:
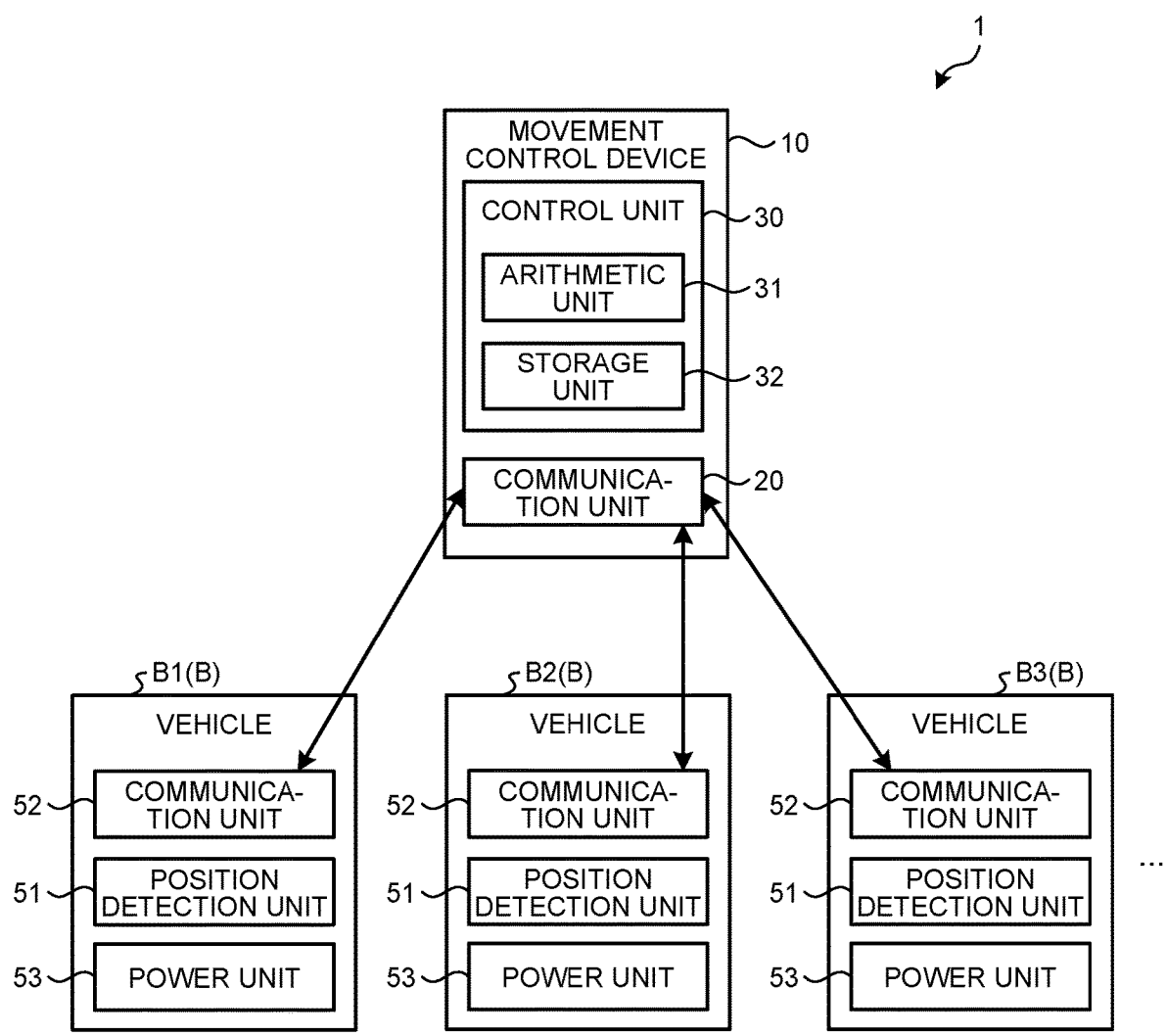
FIG. 1 is a block diagram illustrating a main configuration of a movement control system including a movement control device in a first embodiment.

Referring to the drawings, embodiments of the present invention are described in detail below. Note that the present invention is not limited by the embodiments. Components in the embodiments include the ones that can be easily replaced by a person skilled in the art or the ones that are substantially the same. Furthermore, the components described below can be combined as appropriate.

First Embodiment

FIG. 1 is a block diagram illustrating a main configuration of a movement control system 1 including a movement control device 10 in a first embodiment. The movement control system 1 is a system for controlling movement routes for multiple vehicles B. The movement control device 10 controls the movement of the vehicles B. In FIG. 1 and other figures, the vehicles B are denoted by reference symbols B1, B2, B3 . . . for the purpose of distinguishing from one vehicle B to another.

Each of the vehicles B includes a position detection unit 51, a communication unit 52, and a power unit 53. The position detection unit 51 detects the position of a vehicle B in which the position detection unit 51 is provided. Specific configuration examples of the position detection unit 51 include a positioning device for detecting positions by using a positioning system such as the global positioning system (GPS). The position detection unit 51 may be an inertial navigation device for detecting a position with respect to a predetermined start point.

The communication unit 52 communicates with the movement control device 10. Specific configuration examples of the communication unit 52 include a wireless communication device. The communication unit 52 may perform wired communication with the movement control device 10.

The power unit 53 functions as power for moving the vehicle B. The specific configuration of the power unit 53 depends on operation forms of the vehicle B. As an example, when the vehicle B is a vehicle that travels on the ground, the power unit 53 includes a plurality of wheels and a motor for driving a part or whole of the wheels. The exemplified specific configuration of the power unit 53 is merely an example, and the configuration is not limited thereto. The power unit 53 only needs to function as power that enables the vehicle B to move.

The movement control device 10 includes a communication unit 20 and a control unit 30. The communication unit 20 communicates with the vehicles B. The communication between the movement control device 10 and the vehicle B is performed by communication between the position detection unit 51 and the communication unit 20. The specific configuration of the communication unit 20 is common to the position detection unit 51.

The control unit 30 includes an arithmetic unit 31 and a storage unit 32. The arithmetic unit 31 includes an arithmetic circuit such as a central processing unit (CPU), and performs various kinds of processing related to the movement control of the vehicles B. The storage unit 32 stores therein software program (hereinafter simply referred to as "program") and data used for the processing of the arithmetic unit 31. The program may be stored in the storage unit 32, or may be stored in a storage medium that can be read by the movement control device 10 as a computer. In this case, the movement control device 10 includes a reading device for reading the program from the storage medium. The storage unit 32 stores therein information on the vehicle B acquired through the communication unit 20. For example, information indicating target positions (for example, target positions P1, P2, . . . , Pm) of the vehicles B described later is stored in the storage unit 32.

Figure 2:
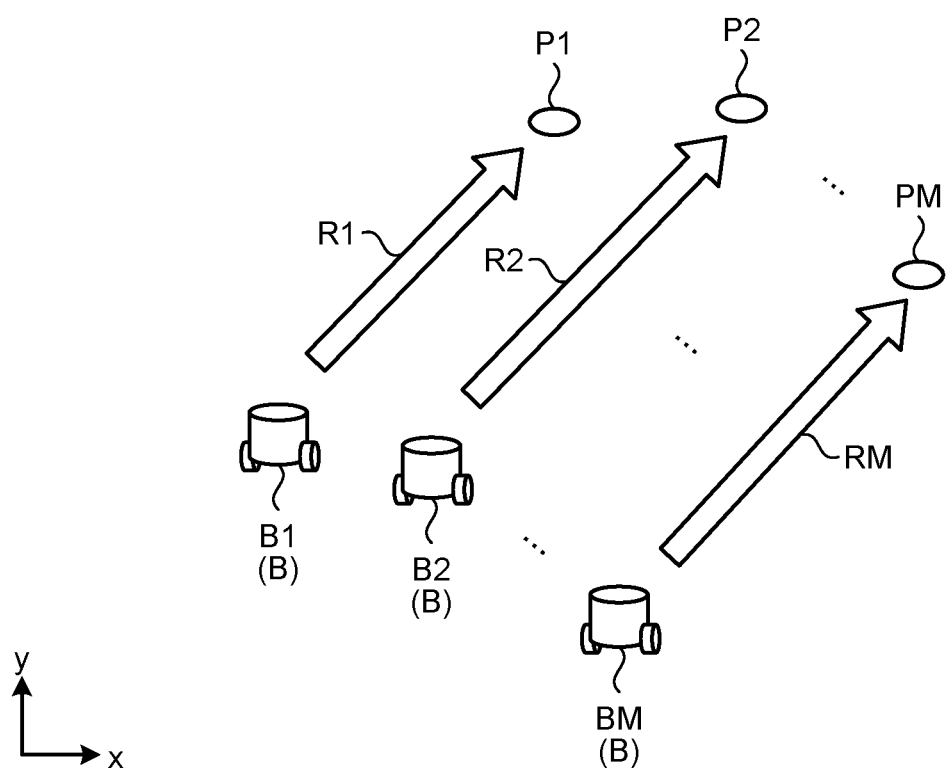
FIG. 2 is a schematic diagram illustrating an example in which multiple vehicles individually move to respective target positions.

FIG. 2 is a schematic diagram illustrating an example in which the vehicles B individually move to the respective target positions P. FIG. 2 exemplifies the case where the number of the vehicles B is M. M is a natural number of 3 or more. The vehicle B1 moves to the target position P1 through a movement route R1. The vehicle B2 moves to the target position P2 through a movement route R2. The vehicle BM moves to the target position PM through a movement route RM. The movement control device 10 performs processing related to the movement control of the vehicles B including the determination of movement routes (for example, movement routes R1, R2, . . . , RM) for the vehicles B.

Each of the vehicles B transmits information indicating the position acquired by the position detection unit 51 to the movement control device 10 through the communication unit 52. The storage unit 32 cumulatively stores therein information indicating the positions of the vehicles B. The arithmetic unit 31 calculates control input for the vehicles B based on information indicating the positions of the vehicles B and information indicating target positions of the vehicles B, and individually transmits control input to the vehicles B through the communication unit 20. The control input functions as information indicating a moving direction and moving speed for moving the vehicles B to positions away from the respective target positions (for example, target positions P1, P2, . . . , PM) by a first distance or more while satisfying a predetermined condition. The vehicle B operates the power unit 53 so as to move in accordance with the control input. The storage unit 32 cumulatively stores therein the control input transmitted to the vehicles B. The predetermined condition is described later.

Taking the case of M=3 as an example, the movement control of vehicles B is described below with reference to FIG. 3 to FIG. 6. Time from movement start elapses in the order of FIG. 3, FIG. 4, FIG. 5, and FIG. 6.

FIG. 3, FIG. 4, FIG. 5, and FIG. 6 are schematic diagrams illustrating vehicles B1, B2, and B3 that move from movement start positions A1, A2, and A3 toward target positions P1, P2, and P3 on a two-dimensional plane set in advance. The frames in FIG. 3 to FIG. 6 schematically illustrate the two-dimensional plane. When the two-dimensional plane is an xy plane, moving speed of one of the vehicles B in an x-axis direction is $u_{mx}(k)$, and moving speed of the one vehicle B in a y-axis direction is $u_{my}(k)$, control input for the one vehicle B is expressed as $u_m(k)=[u_{mx}(k)\ u_{my}(k)]^T$. m=1, 2, . . . , M. In other words, $u_m(k)$ with different values of m indicates control input for different vehicles B. k indicates a time point (time). For example, the arithmetic unit 31 defines a timing at which information indicating the latest positions is transmitted from the vehicles B and acquired by the position detection unit 51 as a current time (k), and calculates control input that should be provided to each of the vehicles B at the current time (k). The following description assumes this definition. For example, the description including the subtraction from k, such as (k−D), indicates a time point (time) older than k. The description including the addition to k, such as (k+D), indicates a time point (time) earlier than k. Note that the superscript T indicates transposition.

Information indicating the positions of vehicles B is provided a plurality of times at different timings. In the first embodiment, the position detection unit 51 detects the position each time a predetermined control cycle elapses, and transmits information indicating the position to the movement control device 10 through the communication unit 52. The arithmetic unit 31 calculates control input based on information indicating the position transmitted each time the control cycle elapses, and transmits the control input to the vehicles B through the communication unit 20. Each of the vehicles B moves by operating the power unit 53 in accordance with the control input newly calculated each time the control cycle elapses.

Figure 3:
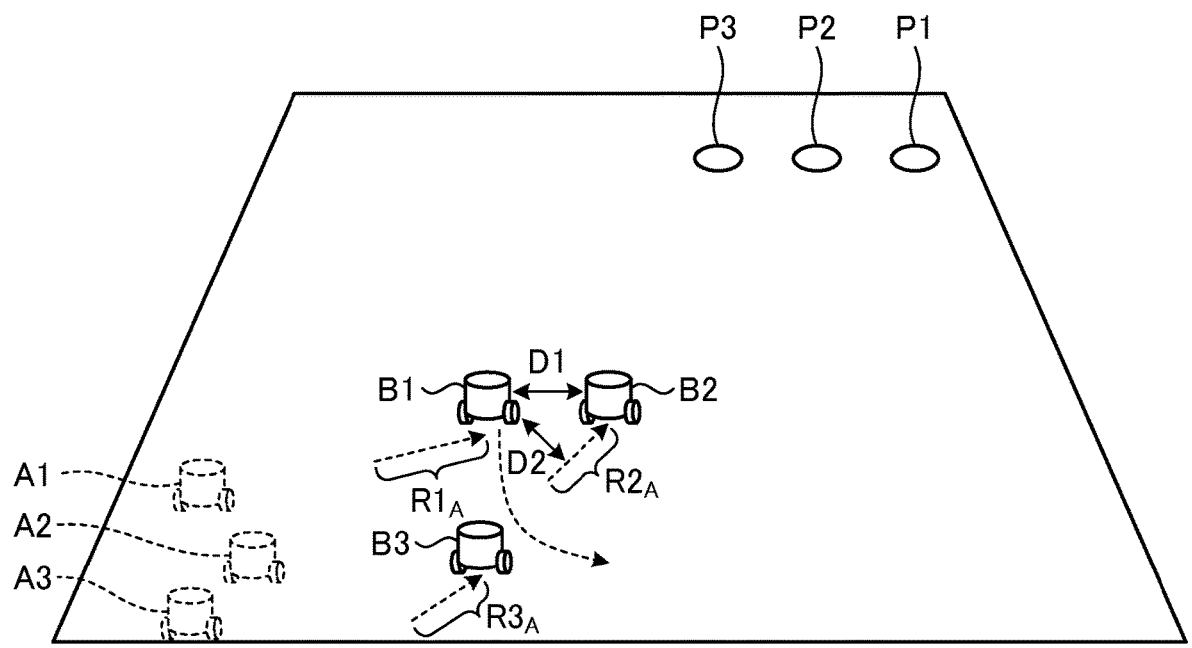
FIG. 3 is a schematic diagram illustrating vehicles that move from movement start positions toward target positions on a two-dimensional plane set in advance.

After the movement control device 10 acquires information indicating the positions of the vehicles B1, B2, and B3, the movement control device 10 calculates control input for the vehicles B1, B2, and B3 such that the vehicles B1, B2, and B3 are moved to positions away from the respective target positions P1, P2, and P3 by a first distance or more while satisfying a predetermined condition. The predetermined condition as used herein includes a first condition that a vehicle B is controlled to be away from another vehicle B by a second distance or more. FIG. 3 exemplifies a distance D1 between the vehicle B1 and the vehicle B2. When the second distance is $d_A$ [m], the distance $D1 \geq d_A$ [m] is established in the positional relation of the vehicle B1 and the vehicle B2 satisfying the first condition. Although not illustrated, the same applies to the positional relation of the vehicle B1 and the vehicle B3 and the positional relation of the vehicle B2 and the vehicle B3.

The predetermined condition includes a second condition that a vehicle B is controlled to be away from a past movement route of another vehicle B by a third distance or more. FIG. 3 exemplifies a distance D2 between the vehicle B1 and a movement route R2$_A$ through which the vehicle B2 has passed until a time before T$_A$ [seconds (sec)]. When the third distance is d$_A$ [m], the distance D2≥d$_A$ [m] is established in the positional relation of the vehicle B1 and the movement route R2$_A$ satisfying the second condition.

Figure 4:
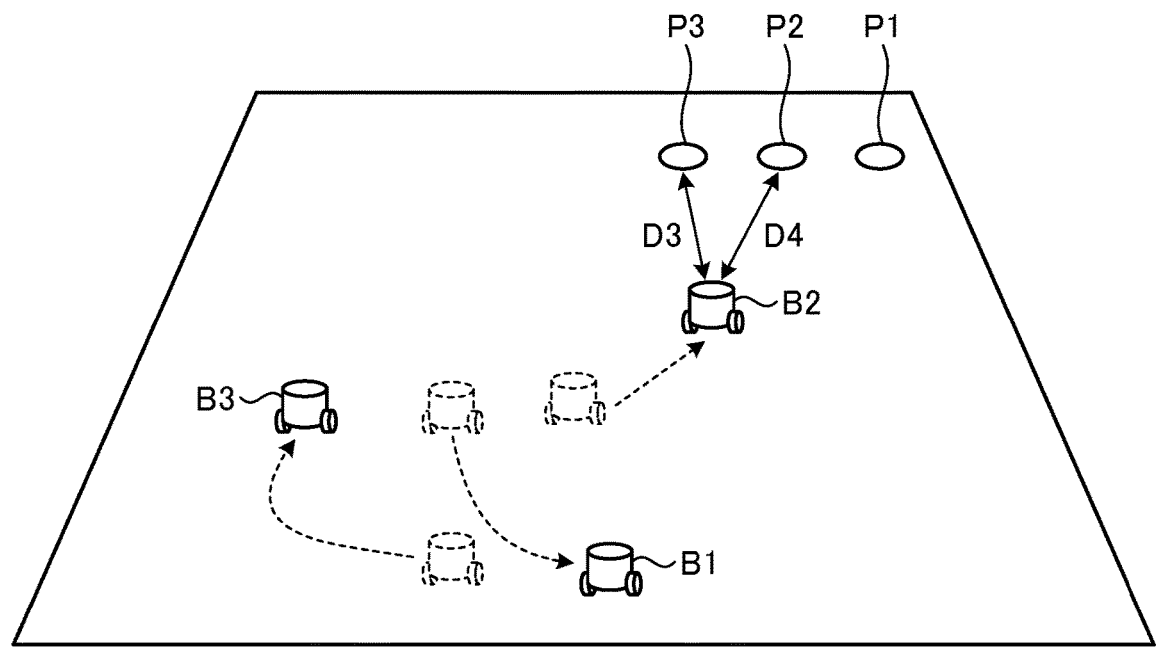
FIG. 4 is a schematic diagram illustrating the vehicles that move from the movement start positions toward the target positions on the two-dimensional plane set in advance.

FIG. 4 illustrates an example in which the movement of the vehicle B1 is controlled so as to turn on the target position P1 side through the movement route R2$_A$ and the movement route R3$_A$ in order to set the distance between the movement route R2$_A$ and the movement route R3$_A$ to be equal to or more than the third distance. FIG. 4 illustrates an example in which the movement of the vehicle B3 is controlled so as to turn on the target position P3 side while detouring the movement route R1$_A$ in order to set the distance from the movement route R1$_A$ to be equal to or more than the third distance. By moving the vehicle B3 so as to turn, the distance from the vehicle B is maintained to be equal to or more than the second distance. Note that the movement routes R1$_A$, R2$_A$, and R3$_A$ are subsequent routes along a time series of positions of the vehicles B detected by the position detection units 51 of the vehicles B and transmitted to the movement control device 10. This configuration is established, for example, when the storage unit 32 stores therein information indicating the positions of the plurality of vehicles B and the arithmetic unit 31 reads and treats the information as subsequent data along the time series. Processing in which the arithmetic unit 31 generates data independently functioning as the movement routes R1$_A$, R2$_A$, and R3$_A$ based on information indicating the positions of the vehicles B may be additionally performed.

The first condition and the second condition are expressed by the following Expression (1). $p_m(k)$ indicates the position of a vehicle B detected by the position detection unit 51. $p_l(k)$ indicates "a position of a vehicle B (another vehicle B) different from the vehicle B when the position of the vehicle B is indicated by $p_m(k)$". Note that $p_m(k) \in R^{2\times 1}$. $R^{2\times 1}$ indicates the xy plane.

$$-\min_{l,\tau}|p_m(k+n) - p_l(k-\tau)| + d_A \leq 0 \quad (1)$$

n in Expression (1) and other equations is n=1, ..., N$_H$. N$_H$ indicates a predictive horizon. The predictive horizon indicates how many steps ahead of the current time (k) the control input and the position of the moved vehicle B are calculated. N$_H$ may be 1 or may be a natural number of 2 or more.

Note that in the first embodiment, the second distance and the third distance are the same distance (d$_A$ [m]), but the second distance and the third distance may be different.

The predetermined condition includes a third condition that a vehicle B is controlled to be away from a target position of another vehicle B by a fourth distance or more. FIG. 4 exemplifies a distance D3 between the vehicle B2 and a target position P3 of the vehicle B3. When the fourth distance is d$_T$ [m], in the case where the third condition is satisfied, the distance D3≥d$_T$ [m] is established. The third condition is expressed by the following Expression (2). Note that q$_l$(k) indicates "a target position of a vehicle B (another vehicle B) different from the vehicle B" when the position of the vehicle B is indicated by $p_m(k)$. On the other hand, $q_m(k)$ indicates a target position of the vehicle B when the position is indicated by $p_m(k)$. Note that $q_m(k) \in R^{2\times 1}$.

$$-\min_{l}|p_m(k+n) - q_l(k)| + d_T \leq 0 \quad (2)$$

The predetermined condition includes a fourth condition that the moving speed of the vehicle B is within a range of a lower limit velocity (V$_{min}$) to an upper limit velocity (V$_{max}$). The state in which the moving speed of the vehicle B is equal to or lower than the upper limit velocity (V$_{max}$) is expressed as the following Expression (3). The state in which the moving speed of the vehicle B is equal to or higher than the lower limit velocity (V$_{min}$) is expressed as the following Expression (4).

$$\sqrt{u_{mx}^2(k+n) + u_{my}^2(k+n)} - v_{max} \leq 0 \quad (3)$$

$$-\sqrt{u_{mx}^2(k+n) + u_{my}^2(k+n)} + v_{min} \leq 0 \quad (4)$$

The state in which "the vehicles B1, B2, and B3 are moved to positions away from the respective target positions P1, P2, and P3 by the first distance or more while satisfying the predetermined condition" refers to the state in which the arithmetic unit 31 sets a condition (fifth condition) that "a vehicle B does not enter the first distance from the target position" in the processing for calculating control input for the vehicle B. FIG. 4 exemplifies a distance D4 between the vehicle B2 and the target position P2. When the first distance is d [m], in the case where the fifth condition is satisfied, the distance D4≥d [m] is established. The fifth condition is expressed as the following Expression (5).

$$-|p_m(k+n) - q_m(k)| + d \leq 0 \quad (5)$$

In the processing related to control input for the vehicles B, predetermined conditions related to the control input for the vehicles B are expressed as the following Expression (6) on the assumption of the conditions indicated by the above-mentioned Expression (1), Expression (2), Expression (3), Expression (4), and Expression (5). Note that L is the number of conditions included in the predetermined conditions. In the first embodiment, L=5.

$$c(u_m(k), \ldots u_m(k+N_H-1)) \leq 0_{N_H L} \quad (6)$$

However, in order to apply model predictive control (MPC) to the processing for calculating the control input for the vehicle B, the relation between the position ($p_m(k)$) of the vehicle B detected by the position detection unit 51 and a future position ($p_m(k+n)$) of the vehicle B after n steps after moving in accordance with the control input ($u_m(k)$) of the vehicle B needs to be defined. Thus, the future position ($p_m(k+n)$) of the vehicle B after n steps is predicted as indicated by the following Expression (7). By combining Expression (1), Expression (2), Expression (3), Expression (4), Expression (5), and Expression (7), the arithmetic unit 31 can apply model predictive control to the processing related to the control input for the vehicle B. Note that the model predictive control refers to a control method for optimization while predicting a future response at each time.

$$p_m(k+n) = p_m(k) + T_S \sum_{j=D}^{n} u_m(k+j) \quad (7)$$

Note that when it is assumed that d in Expression (5) is constant, the vehicle B cannot arrive at the target position. Accordingly, the arithmetic unit 31 updates the first distance (d) to a shorter distance when the position of each of the vehicles B becomes a position within a first distance +α

Figure 5:
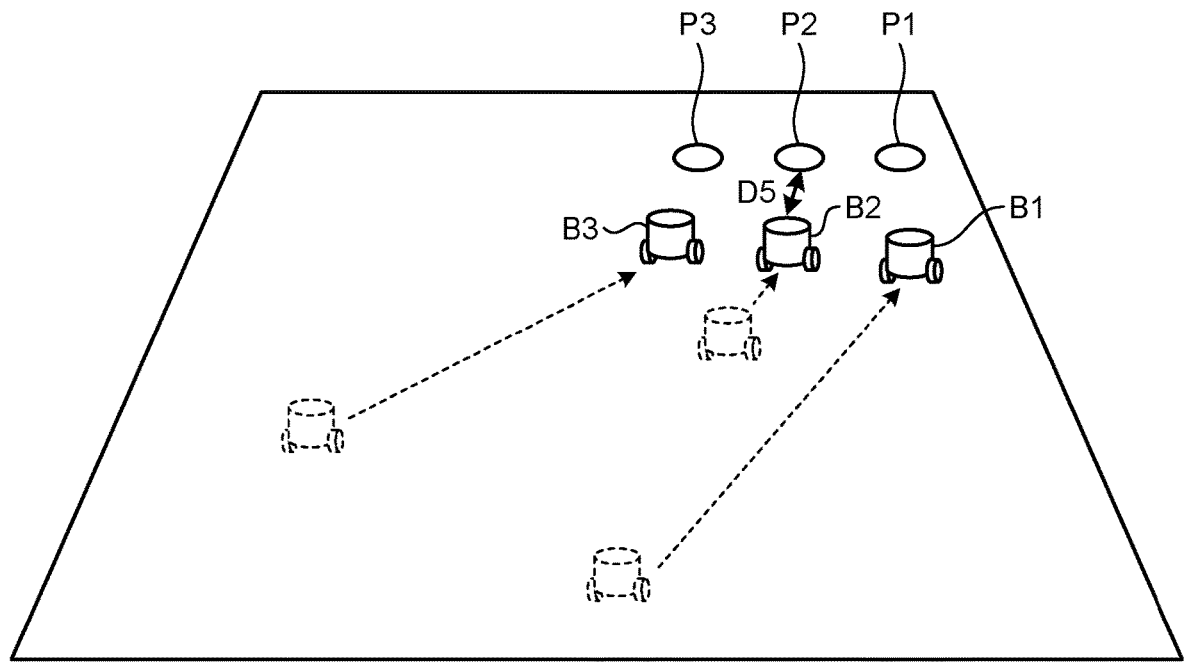
FIG. 5 is a schematic diagram illustrating the vehicles that move from the movement start positions toward the target positions on the two-dimensional plane set in advance.

((d+α) [m]) from the target position. Specifically, the arithmetic unit 31 updates the value of d by subtracting a predetermined decrease amount ($\Delta_d$) of the first distance from the first distance (d) that has been applied until the position of each of the vehicles B becomes a position at the first distance (d) from the target position (d=d−$\Delta_d$). FIG. 5 exemplifies a distance D5 between the vehicle B2 and the target position P2 that has been updated to a distance shorter than the distance D4 illustrated in FIG. 4. Note that a conditional equation for determining whether the position of each of the vehicles B has become a position within the first distance +α ((d+α) [m]) from the target position is obtained by replacing d in Expression (5) with (d+α).

Figure 6:
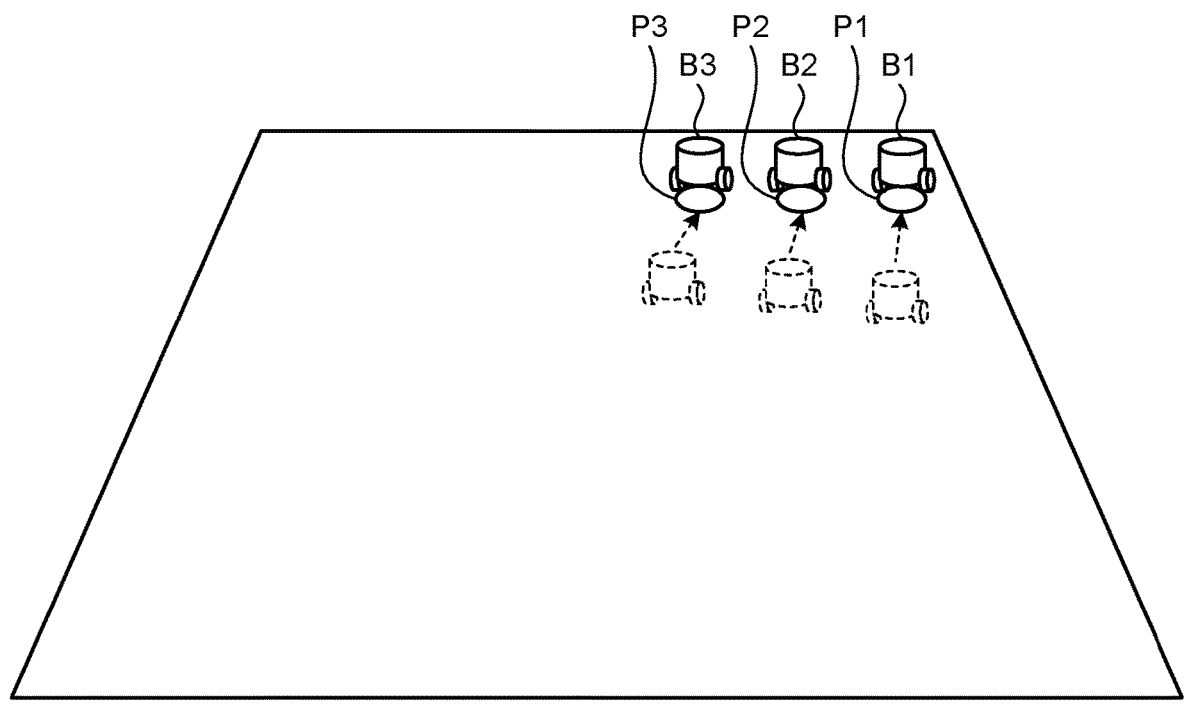
FIG. 6 is a schematic diagram illustrating the vehicles that move from the movement start positions toward the target positions on the two-dimensional plane set in advance.

Until the first distance (d) is updated, the vehicles B are controlled to be located at positions away from the respective target positions by the first distance (d) or more. After that, the first distance (d) is updated to a shorter distance, and hence the vehicles B can move closer to the respective target positions. Such processing for updating the first distance (d) to a shorter distance is repeated such that the vehicles B are coordinated to be closer to the respective target positions. When the first distance (d) is updated to be 0, the vehicles B can arrive at the respective target positions as illustrated in FIG. 6. In this manner, the movement control device 10 can adjust the timings at which the vehicles B arrive at the respective target positions.

Note that the first distance (d) that has never been updated is a value exceeding 0. The first distance (d) is a value that becomes 0 when the decrease amount ($\Delta_d$) is subtracted one or more times. When the first distance (d)=0, the first distance (d) is not updated any more unless the target position is updated as described later.

The value of α [m] is a positive number. α may be a constant or a variable. For example, α may be d/g. g is a natural number. In the first embodiment, the first distance +α ((d+α) [m]) functions as an updating distance. The updating distance is longer than the first distance.

The arithmetic unit 31 may set the timings at which the vehicles B arrive at the respective target positions to be the same or different. The movement control of the vehicles B by the setting and updating of the first distance (d) are intended to coordinate the timings at which the vehicles B are closer to the respective target positions, and are not intended to only control the vehicles B to simultaneously arrive at the respective target positions.

The arithmetic unit 31 sets an evaluation function $J_m$ ($u_m(k), \ldots, u_m(k+N_H-1)$) as indicated by the following Expression (8). $e_m(k+n)$ is a deviation between a future position of the vehicle B after n steps and a target position of the vehicle B. $e_m(k+n)$ is expressed as the following Expression (9). Note that $e_m(k+n) \in R^{2 \times 1}$.

$$J_m(u_m(k), \ldots, u_m(k+N_H-1)) = \sum_{n=D}^{N_H-1} e_m^T(k+n)Pe_m(k+n) \quad (8)$$

$$e_m(k+n) = p_m(k+n) - q_m(k) = p_m(k) + T_S \sum_{j=D}^{n} u_m(k+j) - q_m(k) \quad (9)$$

The arithmetic unit 31 uses the conditions indicated by the above-mentioned Expression (1), Expression (2), Expression (3), Expression (4), Expression (5), and Expression (7) and the evaluation functions indicated by Expression (8) and Expression (9) to solve a constrained optimization problem expressed by the following Expression (10) for each control cycle, and determines control input for each control cycle.

$$\min_{u_m(k), \ldots, u_m(k+N_H-1)} J_m(u_m(k), \ldots, u_m(k+N_H-1)) \quad (10)$$

In the above description, model predictive control is applied to the calculation of control input for each of the vehicles B, but the method for calculating control input is not limited thereto. Nonholonomic models such as an equivalent two-wheel model of a vehicle may be used.

Figure 7:
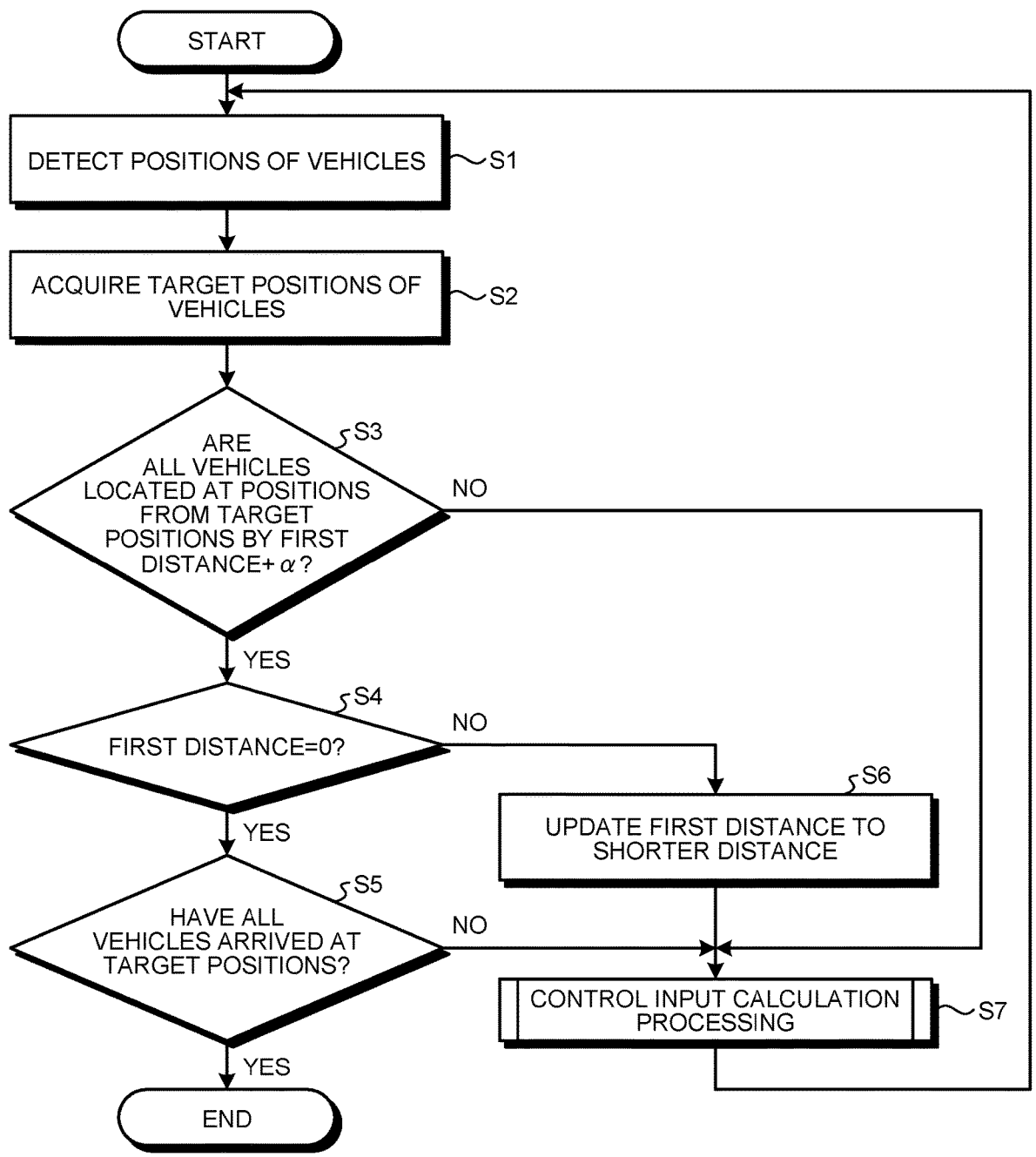
FIG. 7 is a flowchart illustrating the flow of processing performed by the movement control system in the first embodiment.

FIG. 7 is a flowchart illustrating the flow of processing performed by the movement control system 1 in the first embodiment. Each of the vehicles B detects its position by the position detection unit 51 (Step S1), and transmits information indicating the detected position to the movement control device 10 through the communication unit 52. The movement control device 10 acquires information indicating the positions of the vehicles B through the communication unit 20 (Step S2). The arithmetic unit 31 determines whether all the vehicles B are located at positions away from the respective target positions by a first distance +α (Step S3). When it is determined that all the vehicles B are located at positions away from the respective target positions by the first distance +α (Yes at Step S3), the arithmetic unit 31 determines whether the first distance is 0 (Step S4).

When it is determined at Step S4 that the first distance is 0 (Yes at Step S4), the arithmetic unit 31 determines whether all the vehicles B have arrived at the target positions (Step S5). When it is determined that all the vehicles B have arrived at the target positions (Yes at Step S5), the processing related to the movement control of the vehicles B by the movement control system 1 is finished.

When it is determined at Step S4 that the first distance is not 0 (No at Step S4), the arithmetic unit 31 updates the first distance to a shorter distance (Step S6). After the processing at Step S6, the arithmetic unit 31 performs control input calculation processing (Step S7). When it is determined at Step S3 that all the vehicles B are not located at positions away from the respective target positions by the first distance +α (No at Step S3) or when it is determined at Step S5 that one or more vehicles B have not arrived at the target positions (No at Step S5), the flow proceeds to the processing at Step S7.

Figure 8:
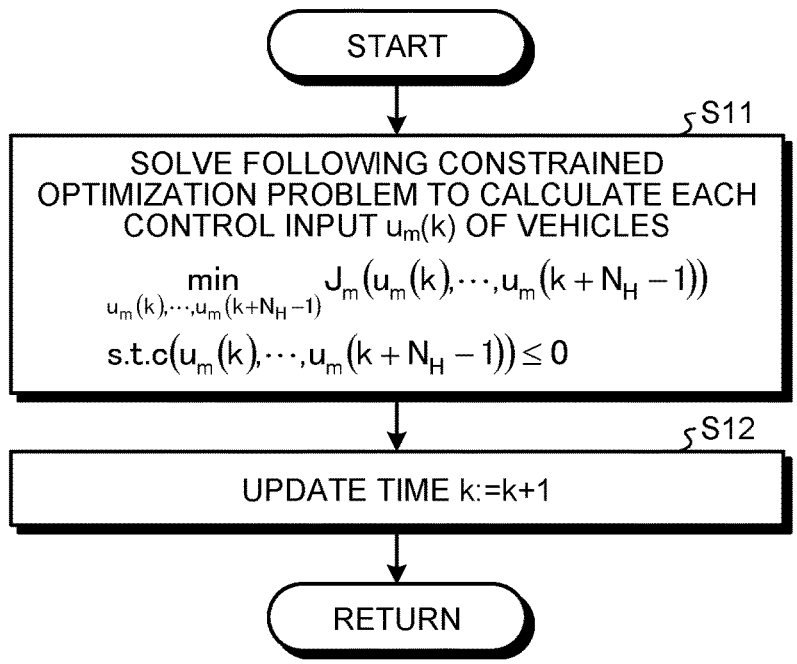
FIG. 8 is a flowchart illustrating the flow of control input calculation processing illustrated in FIG. 7.

FIG. 8 is a flowchart illustrating the flow of the control input calculation processing illustrated in FIG. 7. The arithmetic unit 31 solves the constrained optimization problem indicated by the above-mentioned Expression (10) to calculate a control input ($u_m(k)$) of each of the vehicles B (Step S11). Note that in the description in Step S11, the predetermined condition is indicated by the above-mentioned Expression (6), but in actual cases, the conditions in Expressions (1) to (5), the prediction in Expression (7), and the evaluation functions in Expression (8) and Expression (9) described above are taken into consideration. After the processing at Step S11, the arithmetic unit 31 adds 1 to the value of k (k=k+1) to advance the control cycle by one (Step S12).

After the control input calculation processing described above with reference to FIG. 8, that is, the processing at Step S7, is completed, the flow proceeds to the processing at Step S1.

The case where target positions are fixed has been described above as an example, but the target position may be updated while the vehicle B is moving or after the vehicle B arrives at the target position.

Note that, when the target position is updated, the first distance (d) is set again to a value exceeding 0. The first distance (d) that has never been updated may be constant irrespective of the timing of updating of the target position, or may be individually set before and after the updating of the target position.

According to the first embodiment, after the vehicles B have moved to positions away from the respective target positions by the first distance or more, the first distance is updated to a shorter distance. In this manner, the degrees of proximity of the vehicles B with the respective target positions can be coordinated. Thus, the timings of the arrival at the target positions can be more coordinated.

A vehicle B is controlled to be away from another vehicle B by a second distance or more, and hence the collision and excessive proximity of the vehicles B can be avoided.

A vehicle B is controlled to be away from the past movement route for another vehicle B by a third distance or more, and hence the effect of the movement route for the vehicle B on the movement of another vehicle B can be suppressed. For example, when the vehicle B is configured to move on water or in water, the possibility that waves of wakes affect the movement of another vehicle B can be further reduced.

A vehicle B is controlled to be away from a target position of another vehicle B by a fourth distance or more, and hence the hindering of the arrival or approach to the target position by other vehicles B can be suppressed.

The conditions for the calculation of the control input include a condition that the moving speed of the vehicle B is within the range of the lower limit velocity to the upper limit velocity, and hence the provision of control input that cannot be implemented by the vehicle B can be suppressed.

Second Embodiment

Next, a second embodiment is described. The same configurations as in the first embodiment are denoted by the same reference symbols, and descriptions thereof are omitted. Unless otherwise specified, the second embodiment is similar to the first embodiment.

In the second embodiment, a sixth condition is further added as predetermined conditions. The sixth condition is that "a vehicle B moves out of an entry prohibited region". In other words, the sixth condition is that "a vehicle B does not enter a predetermined entry prohibited region".

Figure 9:
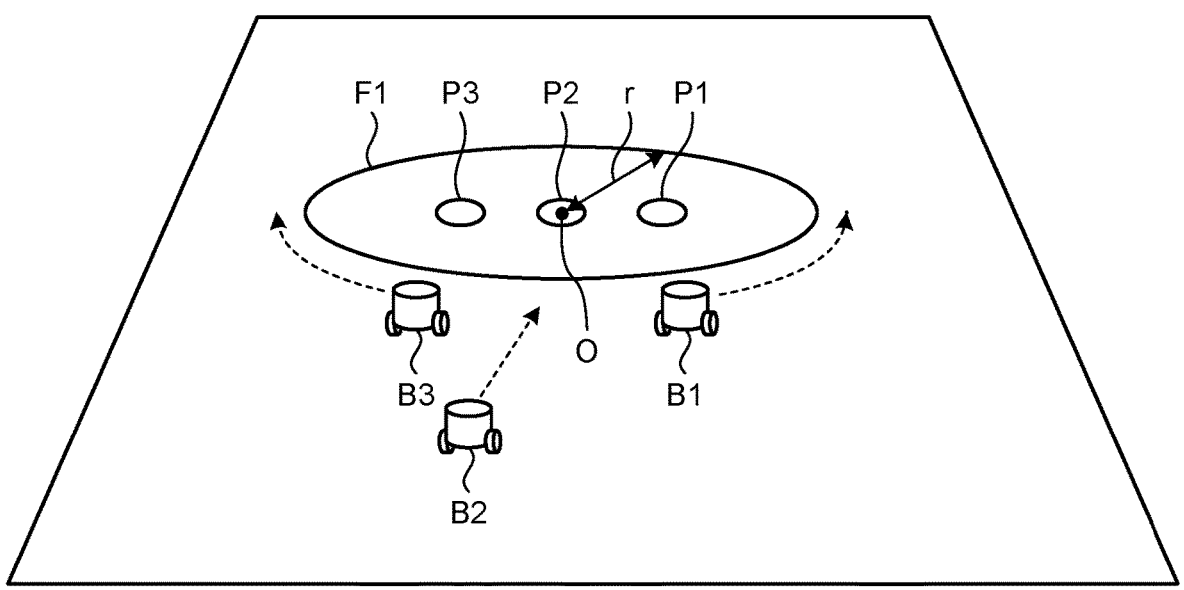
FIG. 9 is a schematic diagram illustrating an example of an entry prohibited region.

FIG. 9 is a schematic diagram illustrating an example of an entry prohibited region F1. In the following description, as illustrated in FIG. 9, the case where the entry prohibited region F1 is a circle having a radius r centered at coordinates $O(x_o(k), y_o(k))$ on the xy plane is exemplified. In this case, the sixth condition can be expressed as the following Expression (11).

$$-(p_{mx}(k+n)-x_o(k))^2-(p_{my}(k+n)-y_o(k))^2+r^2 \leq 0 \quad (11)$$

Note that, when it is assumed that r is constant, the state in which the vehicle B cannot enter the entry prohibited region F1 is not resolved. Thus, when each of the positions of the vehicles B is within a fifth distance from the entry prohibited region F1, the arithmetic unit 31 in the second embodiment updates the entry prohibited region F1 to a narrower region F2 (see FIG. 10).

Figure 10:
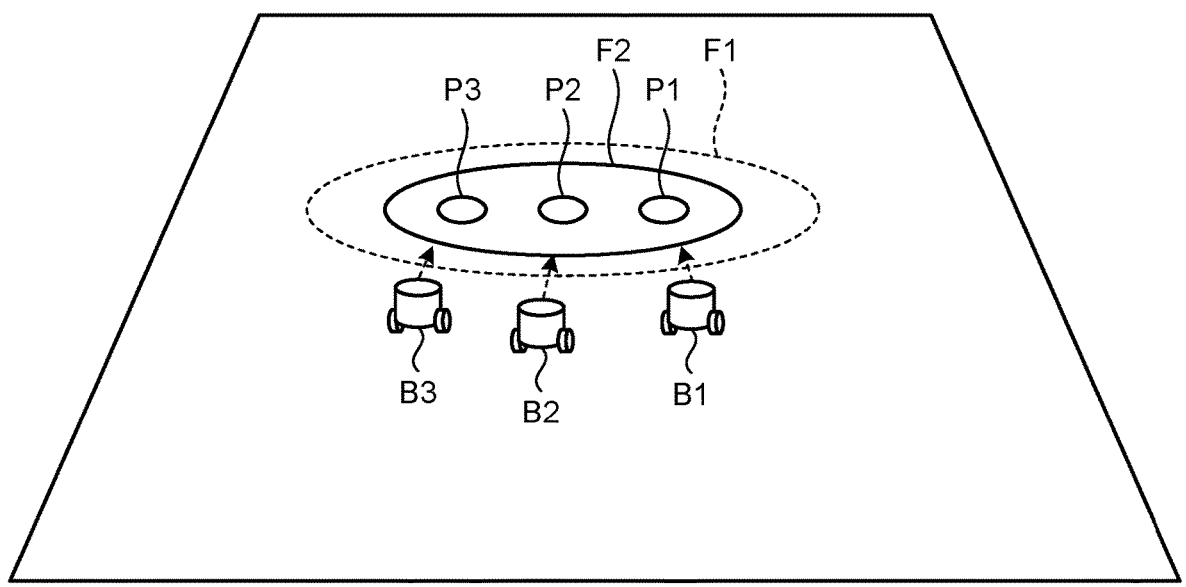
FIG. 10 is a schematic diagram illustrating an example in which the entry prohibited region illustrated in FIG. 9 has been updated to a narrower region.

FIG. 10 is a schematic diagram illustrating an example in which the entry prohibited region F1 illustrated in FIG. 9 has been updated to the narrower region F2. Specifically, when the following Expression (12) is satisfied, the arithmetic unit 31 subtracts a predetermined decrease amount ($\Delta_r$) from r that has been applied, thereby updating the value of r ($r=r-\Delta_r$). In Expression (12), the fifth distance is indicated by ($r+\beta$). Note that $\beta$ is a value exceeding 0. r that has never been updated is a value exceeding 0. r is a value that becomes 0 when the decrease amount ($\Delta_r$) is subtracted one or more times. When $r=0$, the setting of the entry prohibited region is released. In this case, the narrower region F2 is a region within the entry prohibited region F1 before the updating.

$$-(p_{mx}(k+n)-x_o(k))^2-(p_{my}(k+n)-y_o(k))^2+(r+\beta)^2 \leq 0 \quad (12)$$

The entry prohibited region is not limited to be circular. For example, a polygon formed by segments connecting three or more vertices set on the xy plane may be used as an entry prohibited region.

The entry prohibited region F1 illustrated in FIG. 9 includes all target positions of the vehicles B, but is not limited thereto. The entry prohibited regions before and after the updating may include one or more of target positions of the vehicles B, or may include no target position.

Figure 11:
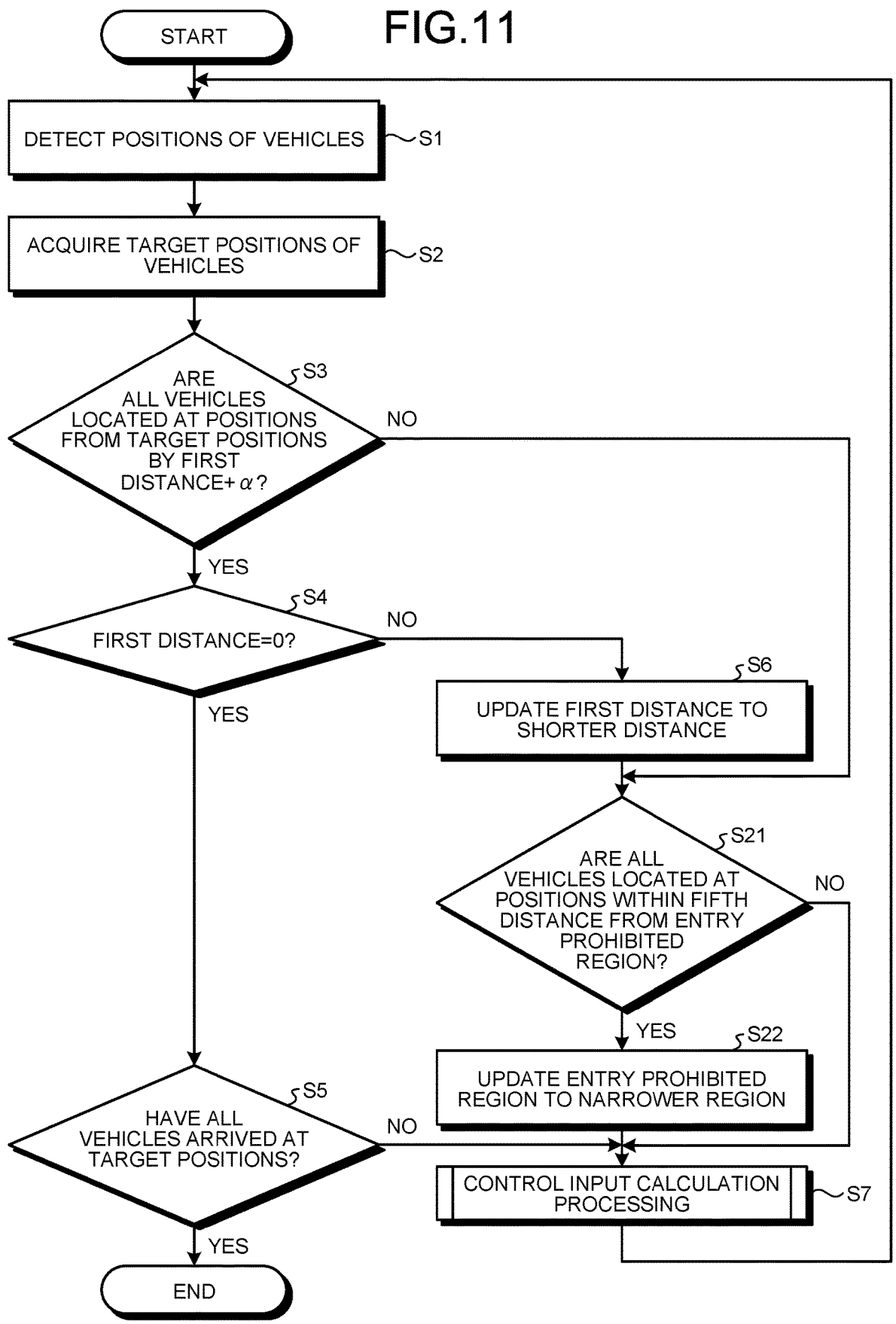
FIG. 11 is a flowchart illustrating the flow of processing performed by a movement control system in a second embodiment.

FIG. 11 is a flowchart illustrating the flow of processing performed by the movement control system 1 in the second embodiment. In the second embodiment, when it is determined at Step S3 that all vehicles B are not located at positions away from respective target positions by the first distance +α (No at Step S3) or after the processing at Step S6, the arithmetic unit 31 determines whether all the vehicles B are located at positions within the fifth distance from the entry prohibited region (Step S21). When it is determined that all the vehicles B are located at positions within the fifth distance from the entry prohibited region (Yes at Step S21), the arithmetic unit 31 updates the entry prohibited region to a narrower region (Step S22). After the processing at Step S22 or when it is determined at Step S21 that one or more vehicles B are not located at positions within the fifth distance from the entry prohibited region (No at Step S21), the flow proceeds to the processing at Step S7. Unless otherwise specified, the flow of processing performed by the movement control system 1 in the second embodiment is similar to the processing performed by the movement control system 1 in the first embodiment described above with reference to FIG. 7 and FIG. 8.

According to the second embodiment, a vehicle B moves outside the entry prohibited region, and hence a region in which the vehicle B and the movement route for the vehicle B are not included can be provided. In particular, by setting the entry prohibited region so as to include target positions of the vehicles B, the possibility that one or more vehicles B become close to a target position of another vehicle B to hinder the movement of the other vehicle B can be more reliably reduced.

When the positions of vehicles B are within the fifth distance from the entry prohibited region, by updating the entry prohibited region to a narrower region, the effects of the entry prohibited region on the vehicles B are uniformly reduced. Thus, the vehicles B can be controlled to move in a more coordinated way.

By setting the updated entry prohibited region to be a region within the entry prohibited region before the updating, the vehicles B can be controlled to move in a coordinated way so as to gradually enter the region within the entry prohibited region before the updating.

Third Embodiment

Next, a third embodiment is described. The same configurations as in at least one of the first embodiment and the second embodiment are denoted by the same reference symbols, and descriptions thereof are omitted. Unless otherwise specified, the third embodiment is similar to the other embodiments.

In the third embodiment, formation organization processing is performed for moving and controlling vehicles B such that a relative positional relation of the vehicles B corresponds to a relative positional relation of target positions individually set for the vehicles B. The formation organization processing is performed before the calculation of control input using the above-mentioned Expression (10).

Figure 12:
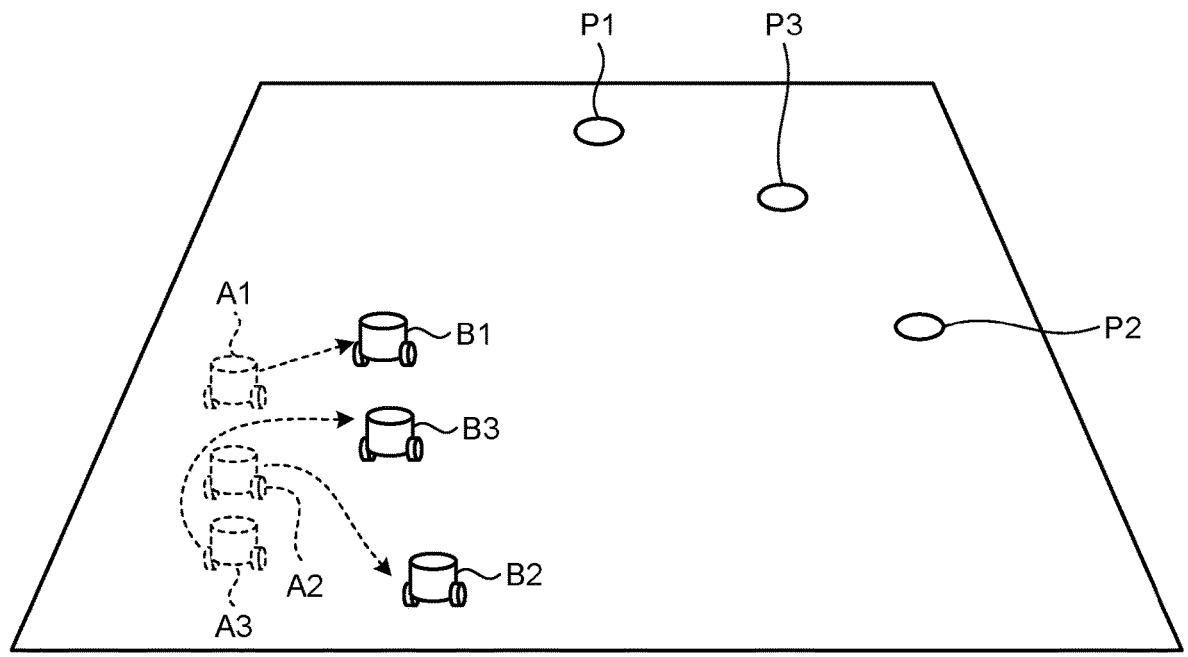
FIG. 12 is a schematic diagram illustrating vehicles that have moved based on formation organization processing.
Figure 13:
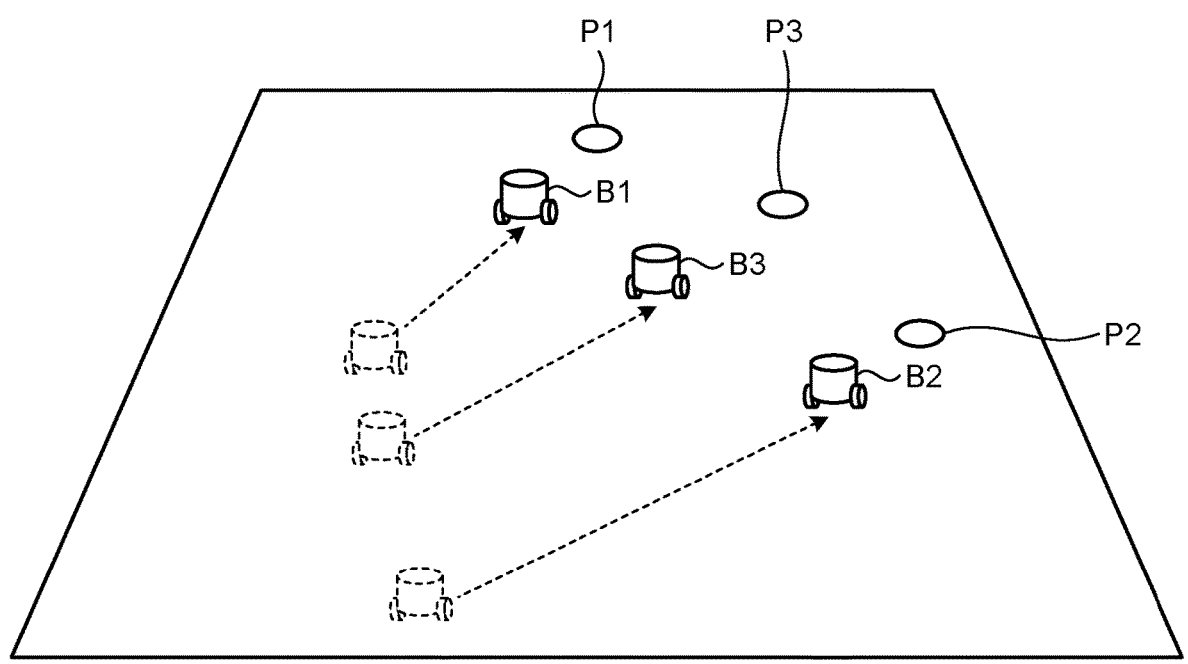
FIG. 13 is a schematic diagram illustrating the vehicles that are closer to target positions after the completion of the formation organization processing.

The formation organization processing is described with reference to FIG. 12 and FIG. 13. FIG. 12 is a schematic diagram illustrating vehicles B1, B2, and B3 that have moved based on the formation organization processing. FIG. 13 is a schematic diagram illustrating the vehicles B1, B2, and B3 that are closer to target positions P1, P2, and P3 after the completion of the formation organization processing.

The relative positional relation of movement start positions A1, A2, and A3 of the three vehicles B1, B2, and B3 illustrated in FIG. 12 are a positional relation in which the movement start position A2 of the vehicle B2 is located between the movement start position A1 of the vehicle B1 and the movement start position A3 of the vehicle B3. On the other hand, the relative positional relation of the target positions P1, P2, and P3 of the three vehicles B1, B2, and B3 is a positional relation in which the target position P3 of the vehicle B3 is located between the target position P1 of the vehicle B1 and the target position P2 of the vehicle B2. As described above, the relative positional relation of the movement start positions A1, A2, and A3 illustrated in FIG. 12 does not correspond to the relative positional relation of the target positions P1, P2, and P3.

Thus, the arithmetic unit 31 in the third embodiment uses the following Expression (13) instead of the above-mentioned Expression (10) to perform formation organization processing and calculate control input. The formation organization processing is performed until the relative positional relation of the vehicles B corresponds to the relative positional relation of the target positions individually set for the vehicles B. The relative positional relation of the three vehicles B1, B2, and B3 illustrated in FIG. 12 corresponds to the relative positional relation of the target positions P1, P2, and P3 because the vehicles B1, B2, and B3 have moved from the movement start positions A1, A2, and A3 in accordance with the control input calculated by the formation organization processing.

$$J_m^0(u_m(k), u_m(k+1), \ldots, u_m(k+N_H-1)) = \sum_{n=D}^{N_H-1} \sum_{l \neq m} (p_m(k+n) - p_l(k) - r_{m,l}(k))^T (p_m(k+n) - p_l(k) - r_{m,l}(k)) \quad (13)$$

Note that $r_{m,l}(k)$ in Expression (13) means a relative positional vector of target positions individually set for the vehicles B. In other words, $r_{m,l}(k)$ means a relative positional relation (formation) corresponding to the relative positional relation. Note that the formation organization processing is not limited to the processing using the above-mentioned Expression (13). For example, the formation organization processing may be processing using a virtual leader.

Whether the formation organization processing is completed can be determined based on the value in Expression (13). The reason is that Expression (13) functions as a value indicating the degree of deviation between the formation ($r_{m,l}(k)$) and the relative positional relation of the vehicles B at the current time (k). After the completion of the formation organization processing, the arithmetic unit 31 calculates control input for the vehicles B by using Expression (10) similarly to the first embodiment or the second embodiment. By moving the vehicles B to the target positions after the completion of the formation organization processing, the possibility of crossing or interference of movement routes for the vehicles B can be more reliably suppressed.

Figure 14:
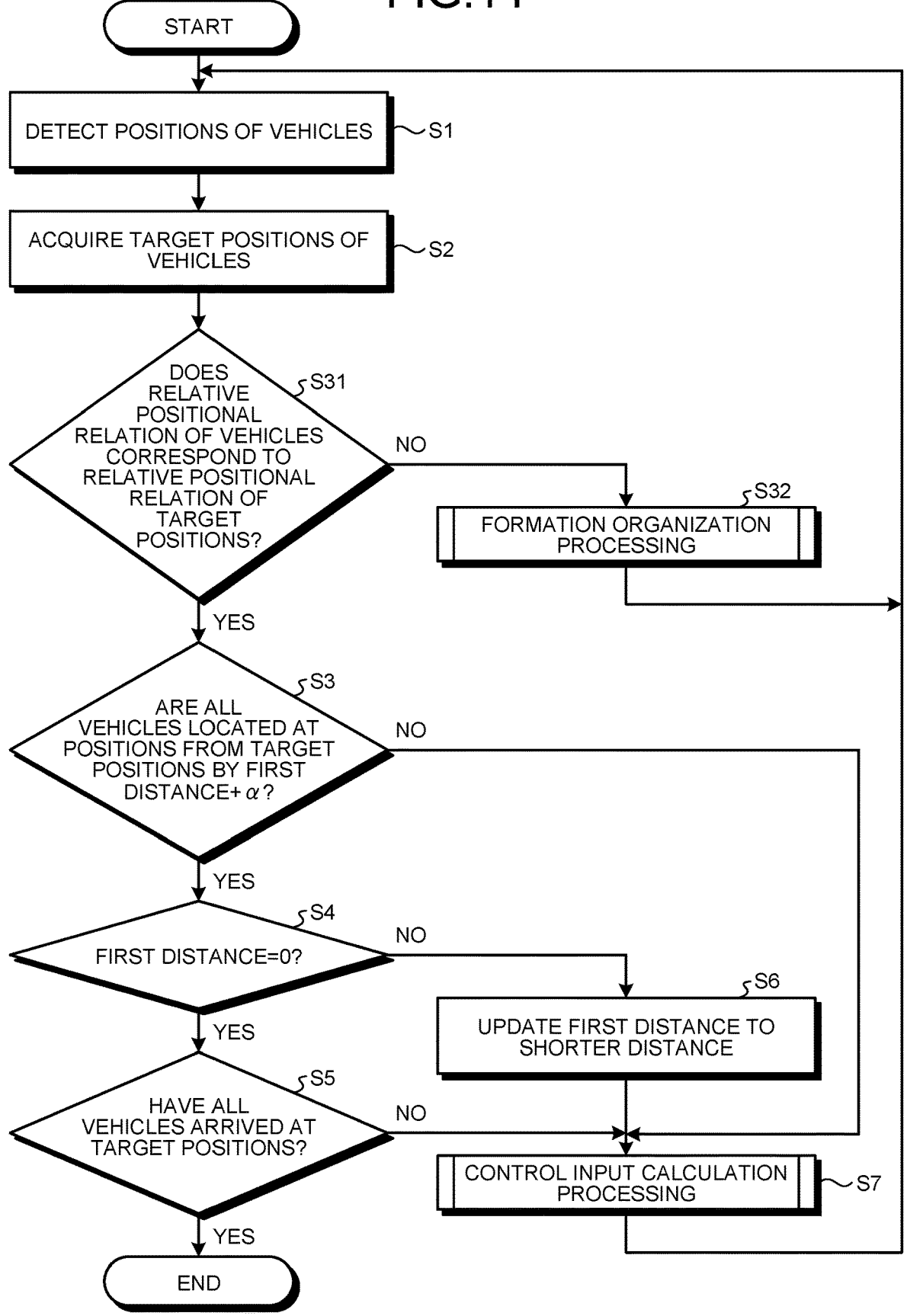
FIG. 14 is a flowchart illustrating the flow of processing performed by a movement control system in a third embodiment.

FIG. 14 is a flowchart illustrating the flow of processing performed by the movement control system 1 in the third embodiment. In the third embodiment, after the processing at Step S2, the arithmetic unit 31 determines whether a relative positional relation of vehicles B corresponds to a relative positional relation of target positions individually set for the vehicles B (Step S31). When it is determined that the relative positional relation of the vehicles B corresponds to the relative positional relation of the target positions individually set for the vehicles B (Yes at Step S31), the flow proceeds to the processing at Step S3. On the other hand, when it is determined that the relative positional relation of the vehicles B does not correspond to the relative positional relation of the target positions individually set for the vehicles B (No at Step S31), the arithmetic unit 31 performs formation organization processing (Step S32).

Figure 15:
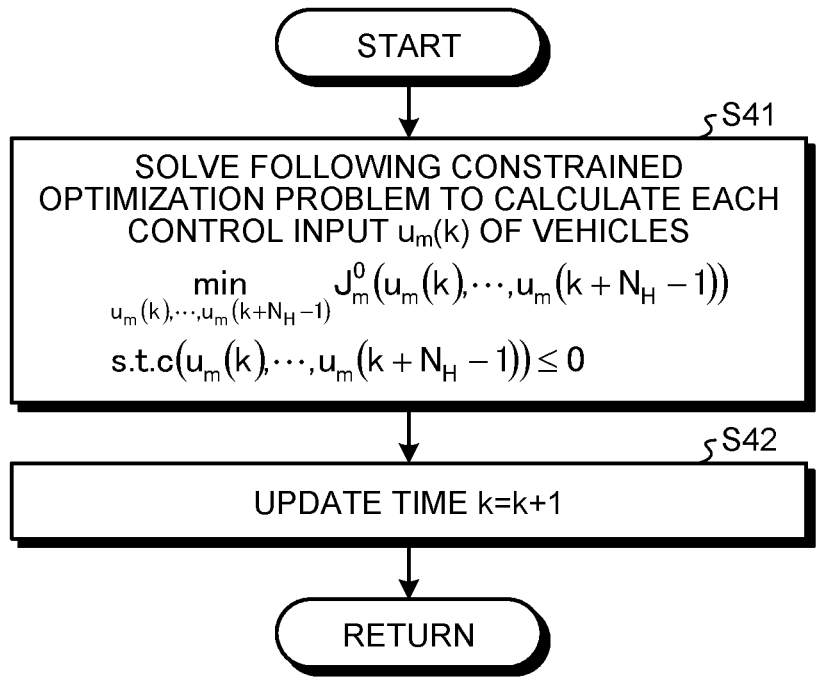
FIG. 15 is a flowchart illustrating the flow of formation organization processing illustrated in FIG. 14.

FIG. 15 is a flowchart illustrating the flow of the formation organization processing illustrated in FIG. 14. The arithmetic unit 31 solves the constrained optimization problem indicated by the above-mentioned Expression (13) to calculate control input ($u_m(k)$) for each of the vehicles B (Step S41). Note that in the description in Step S41, the predetermined condition is indicated by the above-mentioned Expression (6), but in actual cases, the conditions in Expressions (1) to (5), the prediction in Expression (7), and the evaluation functions in Expression (8) and Expression (9) are taken into consideration. After the processing at Step S41, the arithmetic unit 31 adds 1 to the value of k (k=k+1) to advance the control cycle by one (Step S42).

After the control input calculation processing described above with reference to FIG. 15, that is, the processing at Step S32, is completed, the flow proceeds to the processing at Step S1. Unless otherwise specified, the flow of the processing performed by the movement control system 1 in the third embodiment is similar to the flow of the processing performed by the movement control system 1 in the first embodiment described above with reference to FIG. 7 and FIG. 8.

Note that the formation organization processing may be performed in the second embodiment. In this case, the processing at Step S31 is inserted between the processing at Step S2 and the processing at Step S3 in FIG. 11, and the processing is branched or proceeds similarly to the description with reference to FIG. 14 and FIG. 15.

According to the third embodiment, due to the formation organization processing for allowing a relative positional relation of vehicles B to correspond to a relative positional relation of target positions individually set for the vehicles B, the possibility of mutual interference of movement routes for the vehicles B after the formation organization processing can be more reliably reduced.

Fourth Embodiment

Next, a fourth embodiment is described. The same configurations as in at least one of the first embodiment, the second embodiment, and the third embodiment are denoted by the same reference symbols, and descriptions thereof are omitted. Unless otherwise specified, the fourth embodiment is similar to the other embodiments.

Time consumed for data transmission and reception between the vehicle B and the movement control device 10 through communication between the communication unit 52 and the communication unit 20 is not zero. Thus, a time lag occurs between a start timing and a completion timing of one cycle in which the movement control device 10 acquires information indicating the position of the vehicle B detected by the position detection unit 51, calculates control input, and reflects the control input to the operation of the power unit 53 of the vehicle B. Due to the time lag, at a timing at which control input that is optimum on the assumption of the timing of the detection of the position by the position detection unit 51 is reflected to the vehicle B with the time lag, the possibility that the control input is not optimum is not zero because of the movement of the vehicle B during the time lag. The time lag is "wasted time" that should be ideally reduced, but it is difficult to completely reduce the time lag.

Figure 16:
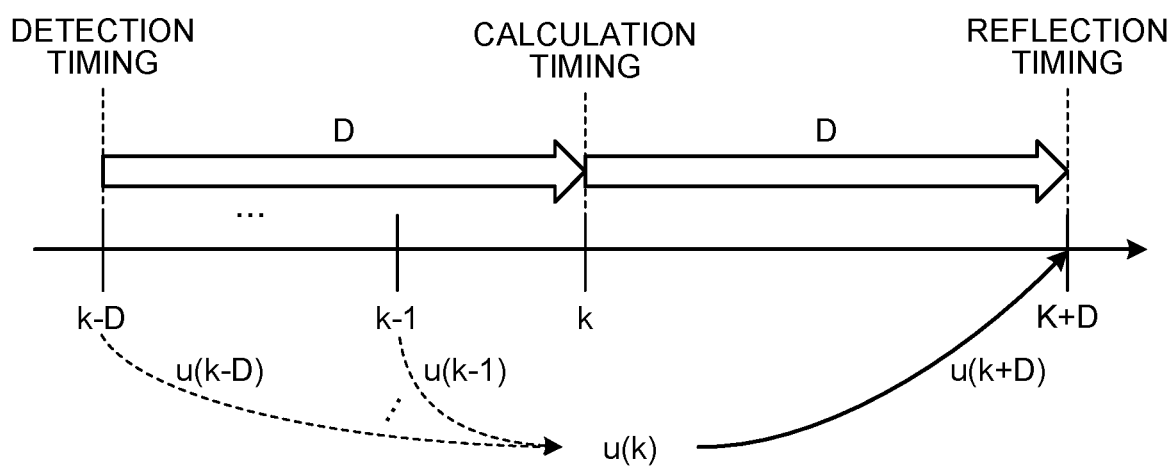
FIG. 16 is a time chart schematically illustrating a relation between a current time and a time lag.

FIG. 16 is a time chart schematically illustrating the relation between a current time (k) and a time lag. In the fourth embodiment, the vehicle B moves as indicated by the following Expression (14) until control input ($u_m(k)$) determined at the current time (k) is reflected to the vehicle B. D in Expression (14) and Expression (15) described below is a value indicating an assumed wasted time. In other words, as illustrated in FIG. 16, the wasted time (D) elapses between a calculation timing of the control input ($u_m(k)$) by the movement control device 10 and a reflection timing of the control input in the vehicle B.

$$T_S \sum\nolimits_{i=1}^{D} u_m(k-i) \qquad (14)$$

Thus, in the fourth embodiment, the control input is calculated in consideration of the above-mentioned time lag. Specifically, the arithmetic unit 31 in the fourth embodiment uses the following Expression (15) instead of Expression (7).

$$p_m(k+n) = p_m + T_s \sum_{i=1}^{D} u_m(k-i) + T_S \sum_{j=D}^{n} u_m(k+j) \qquad (15)$$

In the above-mentioned Expression (15), the movement amount of the vehicle B for the wasted time (D) is reflected to the prediction of a future position of the vehicle B. In Expression (15), the second term ($u_m(k-i)$) on the right-hand side is a term corresponding to control input calculated in the past, which cannot be changed at the current time (k). On the other hand, in Expression (15), the third term ($u_m(k+j)$) on the right-hand side takes increase of predictive horizon due to the lapse of the wasted time (D) into consideration in the calculation of the control input ($u_m(k)$) determined in the first embodiment, the second embodiment, and the third embodiment. In this manner, in Expression (15), the second term on the right-hand side takes the wasted time (D) that has elapsed from a detection timing before the current time (k) into consideration, and the third term on the right-hand side takes the wasted time (D) that elapses from the current time (k) until a subsequent reflection timing into consideration.

As described above, the arithmetic unit 31 in the fourth embodiment includes a plurality of predictive horizons in a time assumed to elapse from the acquisition of the position of the vehicle B by the position detection unit 51 to when the control input ($u_m(k)$) is reflected to the movement of the vehicle B by the power unit 53. The time includes a wasted time (D) that elapses from a detection timing before the current time (k) and a wasted time (D) that elapses from the current time (k) until a subsequent reflection timing, and is thus a time corresponding to 2D. The time corresponding to 2D includes the right-hand side second term ($u_m(k-i)$) and the right-hand side third term ($u_m(k+j)$) in Expression (15), and hence includes predictive horizons. In other words, a future position of the vehicle B at each timing corresponding to each of the predictive horizons is predicted in the time. In this manner, the arithmetic unit 31 in the fourth embodiment calculates control input (right-hand side third term ($u_m(k+j)$) in Expression (15)) to be newly provided, after calculating the position of the vehicle B predicted based on the control input (right-hand side second term ($u_m(k-i)$) in Expression (15)) calculated in the past within the time divided into timings for each timing corresponding to each of the predictive horizons.

According to the fourth embodiment, the vehicle B can be more appropriately moved by control input that takes a time lag from position detection to control input reflection into consideration.

Fifth Embodiment

Next, a fifth embodiment is described. The same configurations as in at least one of the first embodiment, the second embodiment, the third embodiment, and the fourth embodiment are denoted by the same reference symbols, and descriptions thereof are omitted. Unless otherwise specified, the fifth embodiment is similar to the other embodiments.

Figure 17:
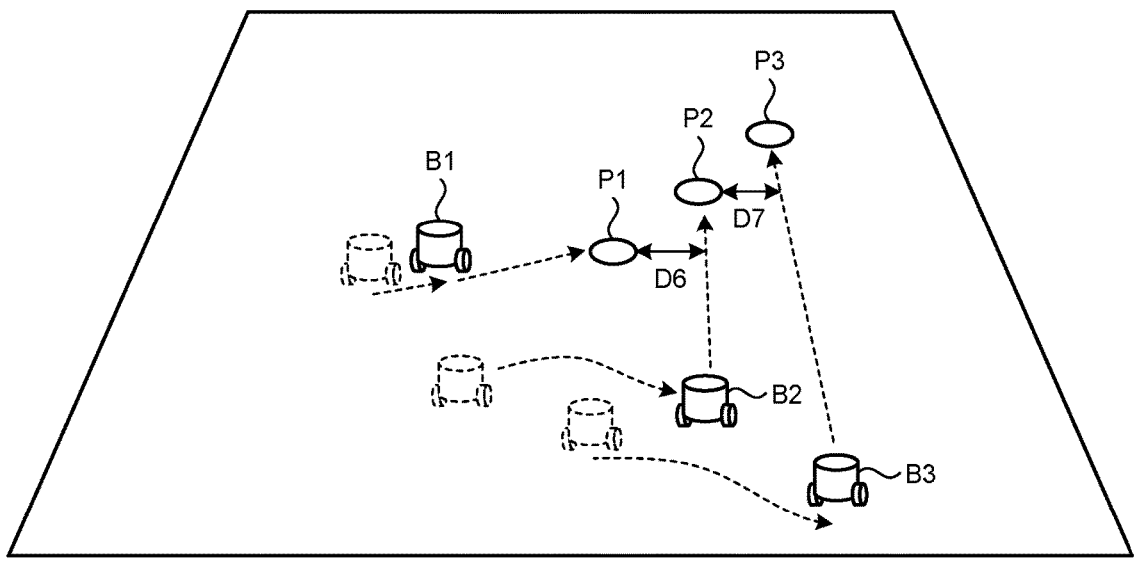
FIG. 17 is a schematic diagram illustrating movement routes for vehicles in a fifth embodiment.

FIG. 17 is a schematic diagram illustrating movement routes for vehicles B1, B2, and B3 in the fifth embodiment. In the fifth embodiment, a seventh condition is further added as predetermined conditions. The seventh condition is that "a distance between a straight line passing through the position of a vehicle B and a target position of the vehicle B and a target position of another vehicle B is equal to or more than a sixth distance". FIG. 17 exemplifies a distance D6 between a straight line L2 passing through the position of the vehicle B2 and a target position P2 and a target position P1 and a distance D7 between a straight line L3 passing through the position of the vehicle B3 and a target position P3 and a target position P2. When the sixth distance is $d_1$ [m], the distance D6 satisfying the seventh condition is distance D6≥$d_1$ [m]. The distance D7 satisfying the seventh condition is distance D7≥$d_1$ [m].

The sixth condition can be expressed as the following Expression (16). In Expression (16), (a,b,c) in the first term of the left-hand side is a straight line passing through the position of a vehicle B and a target position of the vehicle B, and the absolute value of the first term of the left-hand side indicates a distance between the straight line and a target position of another vehicle B.

$$-\min_{m} \frac{|a g_{m,x}(k) + b g_{m,y}(k) + c|}{\sqrt{a^2 + b^2}} + d_1 \le 0 \qquad (16)$$

Note that the effect similar to the sixth condition can also be obtained by adjusting the value of the fourth distance ($d_T$ [m]) in the above-mentioned third condition, but depending on the distance between target positions of the vehicles B, the possibility that the constraint on movement routes for the vehicle B becomes severer due to the effect of the fourth distance ($d_T$ [m]) on the control input is not zero. On the other hand, the seventh condition can more reliably suppress the interference of movement routes for vehicles B while further reducing such constraint on the movement routes.

According to the fifth embodiment, as described above, the interference of movement routes for vehicles B can be more reliably suppressed.

Modification

Next, a modification is described. The same configurations as in at least one of the first embodiment, the second embodiment, the third embodiment, the fourth embodiment, and the fifth embodiment are denoted by the same reference symbols, and descriptions thereof are omitted. Unless otherwise specified, the modification is similar to each of the above-mentioned embodiments.

Figure 18:
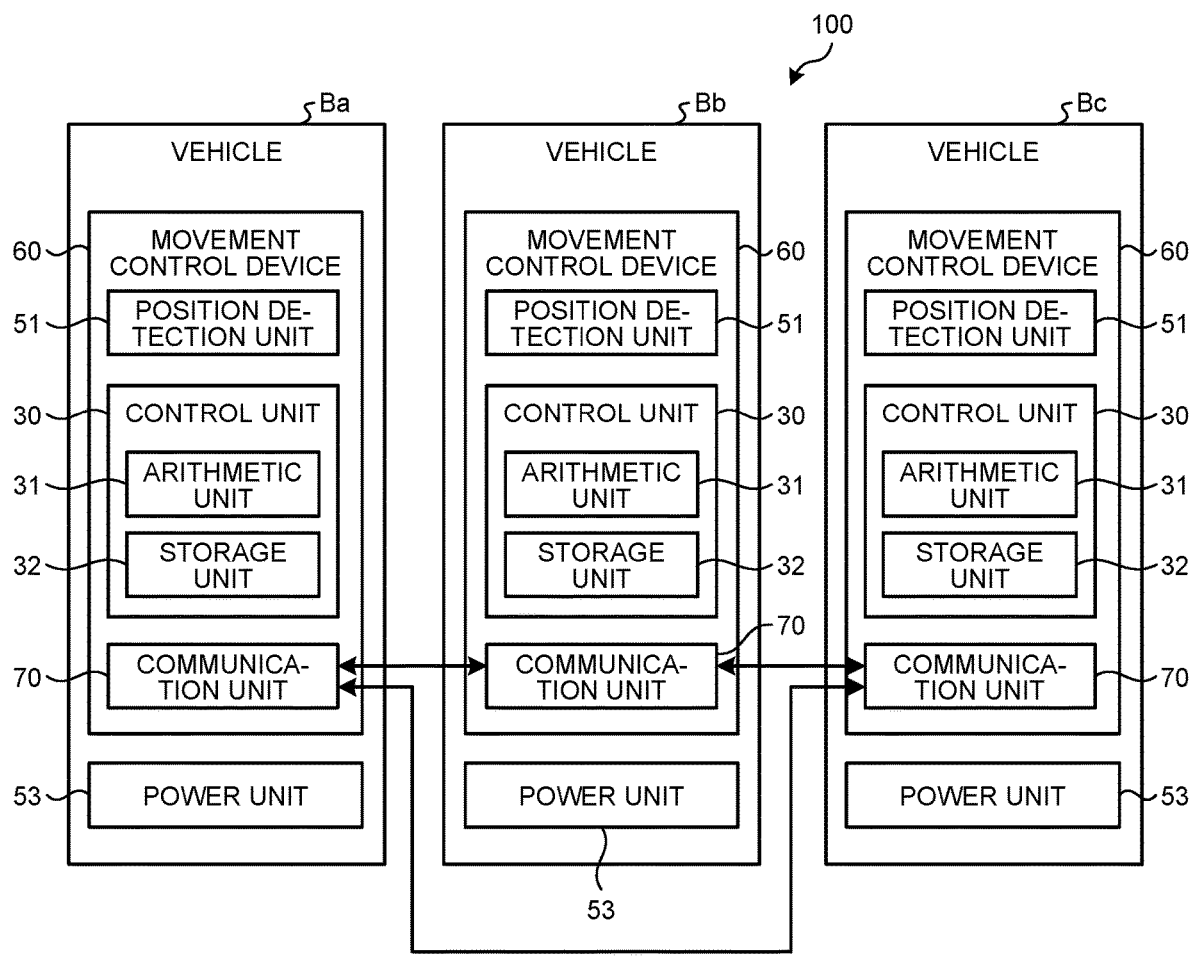
FIG. 18 is a block diagram illustrating a main configuration of a movement control system in a modification.

FIG. 18 is a block diagram illustrating a main configuration of a movement control system 100 in the modification. In the movement control system 1 in FIG. 1 referred to in the description of the first embodiment, the movement control device 10 is provided as a configuration independent from the vehicles B, but in the movement control system 100 in the modification, movement control devices 60 are provided to a plurality of vehicles Ba, Bb, and Bc, respectively.

The movement control device 60 includes a position detection unit 51, a control unit 30, and a communication unit 70. The communication unit 70 includes functions of both the communication unit 52 and the communication unit 20 described above. The communication unit 70 transmits information indicating the position of a vehicle B detected by a position detection unit 51 in the vehicle B including the communication unit 70 to another vehicle B. The communication unit 70 receives information indicating the position of another vehicle B detected by a position detection unit 51 in the other vehicle B. The control unit 30 included in each of the movement control devices 60 in the vehicles Ba, Bb, and Bc calculates control input for all the vehicles (vehicles Ba, Bb, and Bc) similarly to the control unit 30 in the first embodiment. Each of the power units 53 in the multiple vehicles Ba, Bb, and Bc operates in accordance with the control input of the vehicle among the control input calculated by the control unit 30 included in the movement control device 60 in the vehicle provided with the power unit 53.

In FIG. 18, the position detection unit 51 and the communication unit 70 are included in the movement control device 60, but at least one of the position detection unit 51 and the communication unit 70 may be provided to the vehicle B as an independent configuration that is not included in the movement control device 60. In FIG. 18, the movement control system 100 including the three vehicles Ba, Bb, and Bc is exemplified, but the number of the vehicles B included in the movement control system 100 may be two or four or more.

While the first embodiment, the second embodiment, the third embodiment, the fourth embodiment, the fifth embodiment, and the modification have been described above, the embodiments and the modification can be combined as appropriate. In other words, the first embodiment, the second embodiment, the third embodiment, the fourth embodiment, and the fifth embodiment can each be used together with another embodiment without any conflict and inconsistency. The modification can be applied to the first embodiment, the second embodiment, the third embodiment, the fourth embodiment, and the fifth embodiment, and an embodiment in combination of the embodiments.

In the above-mentioned first condition, the function (min) for determining the minimum value is used, but the configuration is not limited thereto. The past point sequences may all be written in constraint conditions. The predetermined condition is not limited to the above-mentioned first condition. For example, a constraint condition may be set to a rudder angle (yaw rate) of the vehicle.

The embodiments and the modification have been presented as an example, and are not intended to limit the scope of the invention. The embodiments and the modification can be carried out in other various forms, and can be variously omitted, replaced, and changed within the range not departing from the gist of the invention. The embodiments and the modification are encompassed in the scope and gist of the invention and similarly encompassed in the invention recited in the claims and its equivalents.

REFERENCE SIGNS LIST 1, 100 MOVEMENT CONTROL SYSTEM
10, 60 MOVEMENT CONTROL DEVICE
20, 52, 70 COMMUNICATION UNIT
30 CONTROL INPUT
31 ARITHMETIC UNIT
32 STORAGE UNIT
51 POSITION DETECTION UNIT
53 POWER UNIT
B, B1, B2, B3, BM, Ba, Bb, Bc VEHICLE

The invention claimed is:

1. A movement control method for a multi-vehicle system for moving multiple vehicles to target positions individually set for the vehicles, the movement control method comprising:
acquiring first positions of the vehicles;
determining control input for moving the vehicles from the first positions to second positions away from the target positions by a first distance or more while the vehicles satisfy a predetermined condition;
updating the first distance to be a shorter distance when a distance between the second position and the target position of each of the vehicles becomes equal to or more than the first distance and within an updating distance; and
transmitting the control input to each of the vehicles,
wherein:
the updating the first distance is repeatedly performed until the first distance reaches zero such that the vehicles are brought closer to the respective target positions in a coordinated way; and
the determining the control input includes dividing a time that is assumed to elapse from the acquiring of the first position of each of the vehicles until reflection of the control input to movement of each of the vehicles into a plurality of timings, and calculating a predicted position of each of the vehicles based on the control input previously calculated for each of the plurality of timings to calculate the control input to be newly provided.

2. The movement control method according to claim 1, wherein the predetermined condition includes a condition that a first of the vehicles is controlled so as to be away from a second of the vehicles by a second distance or more.

3. The movement control method according to claim 1, wherein the predetermined condition includes a condition that a first of the vehicles is controlled so as to be away from a past movement route for a second of the vehicles by a third distance or more.

4. The movement control method according to claim 1, wherein the predetermined condition includes a condition that a first of the vehicles is controlled so as to be away from the target position of a second of the vehicles by a fourth distance or more.

5. The movement control method according to claim 1, wherein the predetermined condition includes a condition that a moving speed of each of the vehicles is within a range of a lower limit velocity to an upper limit velocity.

6. The movement control method according to claim 1, wherein the predetermined condition includes a condition that each of the vehicles moves outside an entry prohibited region.

7. The movement control method according to claim 6, further comprising updating the entry prohibited region to a narrower region when the second position of each of the vehicles is within a fifth distance from the entry prohibited region.

8. The movement control method according to claim 7, wherein the narrower region is within the entry prohibited region before the updating the entry prohibited region.

9. The movement control method according to claim 6, wherein the entry prohibited region includes one or more of the target positions of the vehicles.

10. The movement control method according to claim 1, further comprising controlling a relative positional relation of the vehicles to correspond to a relative positional relation of the target positions individually set for the vehicles,
wherein the controlling the relative positional relation of the vehicles is performed before the determining the control input.

11. The movement control method according to claim 1, wherein the predetermined condition includes a condition that a distance between a straight line passing through the second position of a first of the vehicles and the target position of the first of the vehicles and the target position of a second of the vehicles is a sixth distance or more.

12. A movement control device for moving at least one of multiple vehicles to target positions individually set for the vehicles, the movement control device comprising:
an acquirer configured to acquire first positions of the vehicles; and
a controller,
wherein the controller is configured to:
determine control input for moving the vehicles from the first positions to second positions away from the target positions by a first distance or more while the vehicles satisfy a predetermined condition;
update the first distance to be a shorter distance when a distance between the second position and the target position of each of the vehicles becomes equal to or more than the first distance and within an updating distance;
repeatedly update the first distance until the first distance reaches zero such that the vehicles are brought closer to the respective target positions in a coordinated way;
divide a time that is assumed to elapse from acquiring of the first position of each of the vehicles until reflection of the control input to movement of each of the vehicles into a plurality of timings, and calculate a predicted position of each of the vehicles based on the control input previously calculated for each of the plurality of timings to calculate the control input to be newly provided; and
transmit the control input to each of the vehicles.

13. A movement control system, comprising:
multiple vehicles; and
a movement control device for moving the vehicles to target positions individually set for the vehicles,
wherein the movement control device includes:
an acquirer configured to acquire first positions of the vehicles; and
a controller,
wherein the controller is configured to:
transmit, to each of the vehicles, control input for moving the vehicles from the first positions to second positions away from the target positions by a first distance or more while the vehicles satisfy a predetermined condition;
update the first distance to be a shorter distance when a distance between the second position and the target position of each of the vehicles becomes equal to or more than the first distance and within an updating distance;
repeatedly update the first distance until the first distance reaches zero such that the vehicles are brought closer to the respective target positions in a coordinated way; and
divide a time that is assumed to elapse from acquiring of the first position of each of the vehicles until reflection of the control input to movement of each of the vehicles into a plurality of timings, and calculate a predicted position of each of the vehicles based on the control input previously calculated for each of the plurality of timings to calculate the control input to be newly provided.

14. A movement control system, comprising:
multiple vehicles; and
a movement control device provided to each of the vehicles,
wherein the movement control device includes:
an acquirer configured to acquire first positions of the vehicles; and
a controller,
wherein the controller is configured to:
determine control input for moving the vehicles from the first positions to second positions away from target positions of the vehicles by a first distance or more while the vehicles satisfy a predetermined condition;
apply control input for one of the vehicles to the one of the vehicles;
update the first distance to be a shorter distance when a distance between the second position and the target position of each of the vehicles becomes equal to or more than the first distance and within an updating distance;
repeatedly update the first distance until the first distance reaches zero such that the vehicles are brought closer to the respective target positions in a coordinated way; and
divide a time that is assumed to elapse from acquiring of the first position of each of the vehicles until reflection of the control input to movement of each of the vehicles into a plurality of timings, and calculate a predicted position of each of the vehicles based on the control input previously calculated for each of the plurality of timings to calculate the control input to be newly provided.

15. A non-transitory computer-readable storage medium having stored thereon a program for moving at least one of multiple vehicles to target positions individually set for the vehicles, the program causing a computer to execute:
acquiring first positions of the vehicles;

determining control input for moving the vehicles from the first positions to second positions away from the target positions by a first distance or more while the vehicles satisfy a predetermined condition;

updating the first distance to be a shorter distance when a distance between the second position and the target position of each of the vehicles becomes equal to or more than the first distance and within an updating distance; and transmitting the control input to each of the vehicles, wherein:

the updating the first distance is repeatedly performed until the first distance reaches zero such that the vehicles are brought closer to the respective target positions in a coordinated way; and the determining the control input includes dividing a time that is assumed to elapse from the acquiring of the first position of each of the vehicles until reflection of the control input to movement of each of the vehicles into a plurality of timings, and calculating a predicted position of each of the vehicles based on the control input previously calculated for each of the plurality of timings to calculate the control input to be newly provided.

* * * * *